6466X PARKER & SMITH.
2 Sheets—Sheet 1.
Corn Sheller.
Patented April 9, 1831.
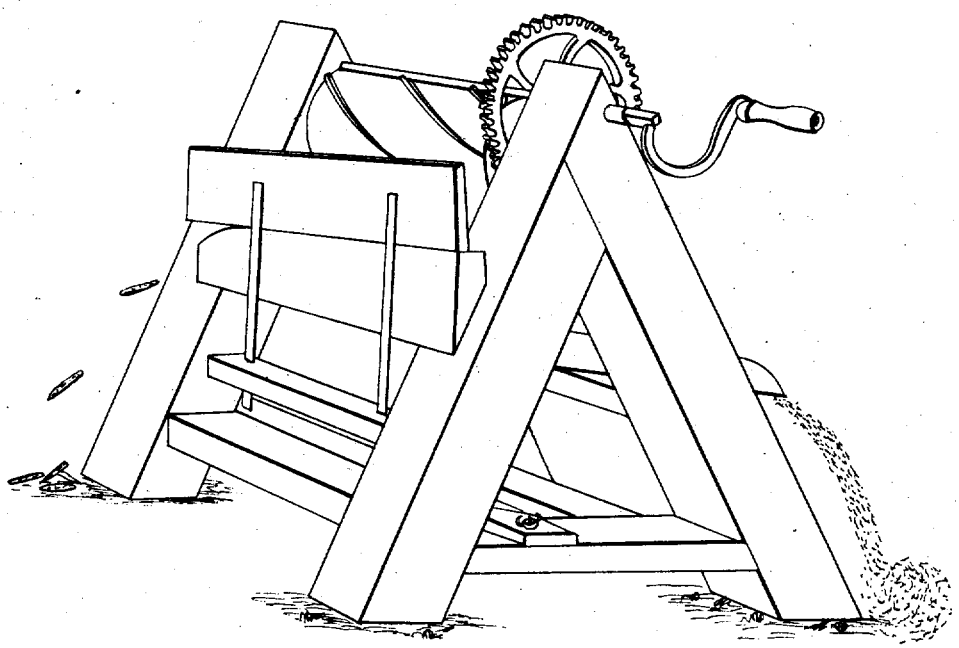
N. PETERS. Photo-Lithographer. Washington, D. C.

6466x
2 Sheets—Sheet 2.
PARKER & SMITH.
Corn Sheller.
Patented April 9, 1831.
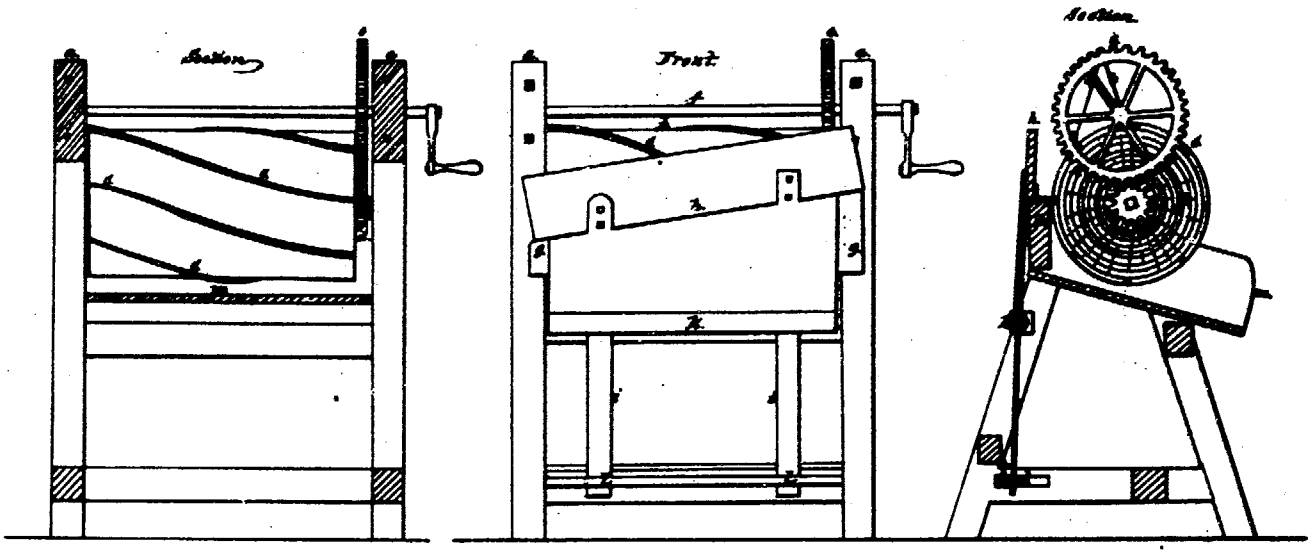

Jabez Parker & Hiram M. Smith
Letters Patent

The Schedule referred to in these Letters Patent and making part of the same containing a description in the words of the said Jabez Parker and Hiram M. Smith themselves of their improvement in the Machine for Shelling Corn

---

To All To Whom These Presents Shall Come Be it known that we Jabez Parker and Hiram M. Smith of the City of Richmond and State of Virginia have invented new and useful improvements in a Machine for Shelling Corn and that the following is a full and exact description of the construction and operation of the said Machine as invented & improved by us. This Machine consists of a frame, a cylinder, gear wheels, a hopper a spout, crank &c. The frame is two feet 5½ inches long and 3 feet 4 inches wide at its feet. It consists of four posts 3 feet 6 inches long 3 inches square and of five girths framed together in the following manner Two posts at each end of the machine are placed together in a triangle form they are halved together at the top and come to a point and fastened together by bolts and nuts, the feet spread two feet four inches, & forming a complete brace. Each of these two end posts have a cross girth three inches square tenoned through them three inches from their feet and are secured by pins. These two end frames are connected together by three girths 2 feet 3½ inches long exclusive of tenons & 3 inches square. one of which is tenoned into the left hand posts on the hopper side six inches from their feet and immediately above the cross girths one other is tenoned into the cross girths three inches from the right hand posts and the other one is tenoned into the right hand posts one foot four inches from their feet which girths are secured by pins or bed screws. Two feet six inches from the feet and one foot from the top in the centre of the right hand posts, is the cylinder shaft upon which the cylinder is hung. which shaft is of wrought iron and is 2 feet 7½ inches long and 7/8 or 1 inch square, it has bearings turned at each end 6466x Apl 9 1831 end 2½ inches long. On the crank end of this shaft (or may be put on
either end) is a spur pinion 4 inches in diameter and one inch thick
with a hub projecting half an inch which pinion has 15 cogs and is
fitted firm upon the shaft and square with the end of the cylinder,
and the hub even with the shoulder of the bearing. The cylinder is two
feet long & 13 inches in diameter at each end. it is gradually dimin
ished in the centre one eighth of an inch or sufficient to bring it when
turning at equal distance from end to end from the ledger in its de
clining position with the side of the cylinder. The cylinder is made
of a solid stick of oak or other seasoned hard wood or of seasoned oak
or other hard wood plank and staves 1½ inch thick. When made of
plank and staves, the heads are of two thicknesses with their grains re-
versed to prevent splitting and are nailed or screwed together. These
heads are fitted firmly upon the shaft at their proper places and are
then turned upon the shaft to such size as with the thickness of the
staves will make the sized cylinder wanted. The staves are three or
four inches wide, their edges are jointed beveling like barrel staves, their
ends hollowed and fitted upon the heads and are placed close togeth
er and nailed or screwed firm to the heads. The cylinder is then turn
ed in a lathe or in its destined place to move to the size and dimension
before stated. Eight iron plates or ribs are placed spirally and at equal
distance from each other upon the cylinder, extending from end to end
with their thick edges to the left or towards the hopper and are made fast
to the cylinder by screws and nails. These rods are half an inch wide
and 3/8 or ¼ of an inch thick on one edge and half that thickness on the
other edge, and two inches of their foot ends are bent to the right or
towards their thin edge forming a knee, the ends being turned one inch
from the straight line of the rod. To find where to place these rods upon
the cylinder make a dot at the crank end of the cylinder from which
strike a direct line to within 1½ inch of the other end and from thence
measure back to the right upon the surface 9¼ inches and make anothe
dot and place the end of the plate or rod upon the first dot and the
knee upon the 2d and secure it there and the others [illegible] are placed in
the 64166x Apl 9, 1831 the same direction of the first and at equal distances from each other,
Seven and a quarter inches above the cylinder shaft and near the
upper or outer edge of the right hand posts is the crank shaft which
is of round or square wrought iron 3/4 or 7/8 of an inch in diameter and
has a bearing turned at the foot end 1½ inch long and one on the crank
end three inches long; it passes through the post and has a crank upon
the end; it is secured to the posts by caps and screws one half of the di-
ameter of the shaft being let into the posts and the other half into the
caps. Upon this shaft immediately over the pinion on the cylinder
shaft is a spur wheel 12 inches in diameter and one inch thick in
rim and 1½ inch at hub. It has 45 cogs which gear into the pinion
by which, and the crank on the end of this shaft the machine is put
in operation, and which gives the cylinder three revolutions to one of the
crank. Upon the outside of the left hand posts at the side of the cylin-
der is a leger, the bottom of which runs parallel with the cylinder and
the top is square and plated with iron and forms the bottom of the
hopper. This ledger is two inches thick and 6 inches wide at the
crank end and 3 inches wide at the other end, making a descent from
one end to the other of 3 inches. It is let into the posts 1 foot 11½ inches
from their feet so as to stand erect on edge and the top within 7/8 of an
inch of the ribs upon the cylinder, and the crank end half an inch
above, and the other end two and a half inches below the centre of
the cylinder and is there made fast to the posts by screws or nails.
The foot end of the ledger below the end of the cylinder is sloped, and
with the posts is hollowed out so as to give free passage to the cobs.
Immediately above the ledger and running parallel with it is a
board of nearly the same length of the hopper, the upper end being even
and its foot extending the length of the cylinder. This board is 6 inches
wide and one inch thick and stands nearly erect on edge a little
leaning to the cylinder and two inches of the inside bottom of it is
plated with iron and with the leger forms the hopper. It is eleva-
ted upon two perpendicular wood springs, just high enough
for its bottom to clear the top of the ledger. The springs are placed
fifteen 6466x Apl 9, 1831 fifteen inches apart, the upper one is grooved into and the other one is
nailed or secured to the outside back of the hopper. The springs are
two feet long 2 inches wide and half an inch thick and pass thro
a revolving girth placed in their centre and have a thin ledger
nailed to their back which rests upon the revolving stay girth sup
porting the hopper at its proper height and the feet of the springs enter
two Mortises in a slide girth which rests upon the two cross girths. The
revolving stay girth is 2 inches square and is tenoned into the centre
of the left hand posts 1 foot 5 inches from their feet by round tenons on
which it turns to accommodate the movement and spring of the hop-
per. The slide girth is 1½ inch wide and 1 inch thick and has a bolt
at each end which passes through oblong mortises in the cross girths and
through said slide girth with nuts upon the top by which it is secur
ed to the cross girths wherever wanted. and by sliding this girth
which governs the feet of the hopper springs the hopper swings upon
the revolving stay girth and is enlarged or diminished to suit any
sized ears and is there secured by said bolts and nuts. The spout
which conveys off the corn as shelled is made of boards half an inch
thick. it is 1 foot 8 inches long and 2 feet 2 inches wide. the upper
end of the bottom of the spout is nailed to the bottom of the ledger
and the lower end rests upon and is nailed to the right hand girth;
its sides are six inches high and are nailed to the bottom. the upper
ends fitting to the ledger. The operator turns the crank with his
right hand and puts the ears into the hopper with his left, and
the springs of the hopper bear them to the cylinder while the iron
ribs upon it strike them, turn them swiftly round, shell them, and
force the cobs out at the foot of the hopper, with great rapidity and
the corn is conveyed off by the spout to itself. = The great improve
ments made in this machine for which we claim an exclusive right
as original inventors. consists 1st in gearing it and applying a
crank to an extra gear shaft immediately over the cylinder by
which the speed of the cylinder is increased three fold and may be
more and its movement reversed so as to place the hopper upon the 64606x    apl 9. 1831 the opposite side of the cylinder from what has heretofore been done
and convenient to the operators left hand. thereby enabling him
to turn the machine with his right hand and feed with his left
which saves the labor of a second person to feed as here tofore requir-
ed. 2nd in applying the revolving girth as a stay to the centre of the hop-
per springs, and a slide girth. bolts and nuts to the feet of said springs
by which they have double the length of spring and the hopper is
varied to suit any sized ears of corn with much more ease and
in one quarter of the time required to do it by moving the cylinder
by means of wedges as heretofore done. 3d in bending the ends of the
iron ribs placed upon the cylinder by which means the cobs are
forcibly thrown clear from the machine. and 4th in making the
frame, in an easy simple triangle form, thereby making it a firm
substantial brace to itself. By these improvements the machine
is made for about the same expense of the former kind and is
more substantial and and durable and less liable to get out of order
and is easier managed, will do the work better, and about three
times as fast & with only half the labor. =

In witness that the fore-
going is a true specification of said corn shelling machine as im-
proved by us we have hereunto set our hands and seals this 25th
day of February 1831

Witnesses
Geo W. Banks
Granville D. Allen

Jabez Parker
Hiram M. Smith

Cyd
[illegible]

(2100 Words)

Patented April 9. 1831